(12) United States Patent
Vettese et al.

(10) Patent No.: US 8,591,114 B2
(45) Date of Patent: Nov. 26, 2013

(54) SPINDLE

(75) Inventors: Sharolyn Vettese, North York (CA); Dan Balean, Kitchener (CA); Martin Pinnau, St. Clements (CA)

(73) Assignee: Wind Simplicity Inc., North York, Ontario (CA)

( * ) Notice: Subject to any disclaimer, the term of this patent is extended or adjusted under 35 U.S.C. 154(b) by 135 days.

(21) Appl. No.: 13/169,354

(22) Filed: Jun. 27, 2011

(65) Prior Publication Data

US 2012/0328440 A1    Dec. 27, 2012

(51) Int. Cl.
*F16C 19/00*    (2006.01)
*F16C 33/66*    (2006.01)

(52) U.S. Cl.
USPC ............................ 384/462; 384/467; 384/474

(58) Field of Classification Search
USPC .................................... 290/55; 384/462–474
See application file for complete search history.

(56) References Cited

U.S. PATENT DOCUMENTS

| | | | | |
|---|---|---|---|---|
| 2,103,912 A | * | 12/1937 | Montgomery | 384/613 |
| 4,668,109 A | * | 5/1987 | Basso | 384/518 |
| 5,051,007 A | * | 9/1991 | Maddox et al. | 384/606 |
| 5,246,087 A | * | 9/1993 | Schipper | 184/5 |
| 5,253,733 A | * | 10/1993 | Miyachi | 184/6.26 |
| 5,520,468 A | * | 5/1996 | Iguchi | 384/473 |
| 5,938,225 A | * | 8/1999 | Scheibe et al. | 280/279 |
| 6,478,553 B1 | * | 11/2002 | Panos et al. | 417/407 |
| 7,214,037 B2 | * | 5/2007 | Mavrosakis | 417/407 |

* cited by examiner

*Primary Examiner* — Phillip A Johnson
(74) *Attorney, Agent, or Firm* — Shoemaker and Mattare

(57) ABSTRACT

A spindle is provided, comprising a spindle body having a first end, a second end, and a channel extending from the first end to the second end; a first end cover and a second end cover, the first and second end covers being releasably securable to the first and second ends, respectively, for defining a sealed space within the channel; the channel being configured for receiving at least one ball bearing assembly, a shaft, and a fluid; such that the at least one ball bearing assembly, a portion of the shaft, and the fluid are contained within the sealed space when the first and second end covers are secured to the first and second ends.

7 Claims, 4 Drawing Sheets

SPINDLE

FIELD

The specification relates generally to wind turbines, and specifically to a spindle for a wind turbine.

BACKGROUND

Wind turbines, and rotational equipment in general, can be exposed to a wide variety of operating conditions (such as wind speeds and directions). These conditions, as well as the extended periods of time for which wind turbines often remain in near-constant operation, impose stresses on the moving parts of the turbines that can result in damage and undesirable down-time for maintenance.

BRIEF DESCRIPTIONS OF THE DRAWINGS

Embodiments are described with reference to the following figures, in which.

DETAILED DESCRIPTION OF THE EMBODIMENTS

According to aspects of the specification, a spindle is provided, comprising a spindle body having a first end, a second end, and a channel extending from the first end to the second end; a first end cover and a second end cover, the first and second end covers being releasably securable to the first and second ends, respectively, for defining a sealed space within the channel; the channel being configured for receiving at least one ball bearing assembly, a shaft, and a fluid; such that the at least one ball bearing assembly, a portion of the shaft, and the fluid are contained within the sealed space when the first and second end covers are secured to the first and second ends.

Figure 1:
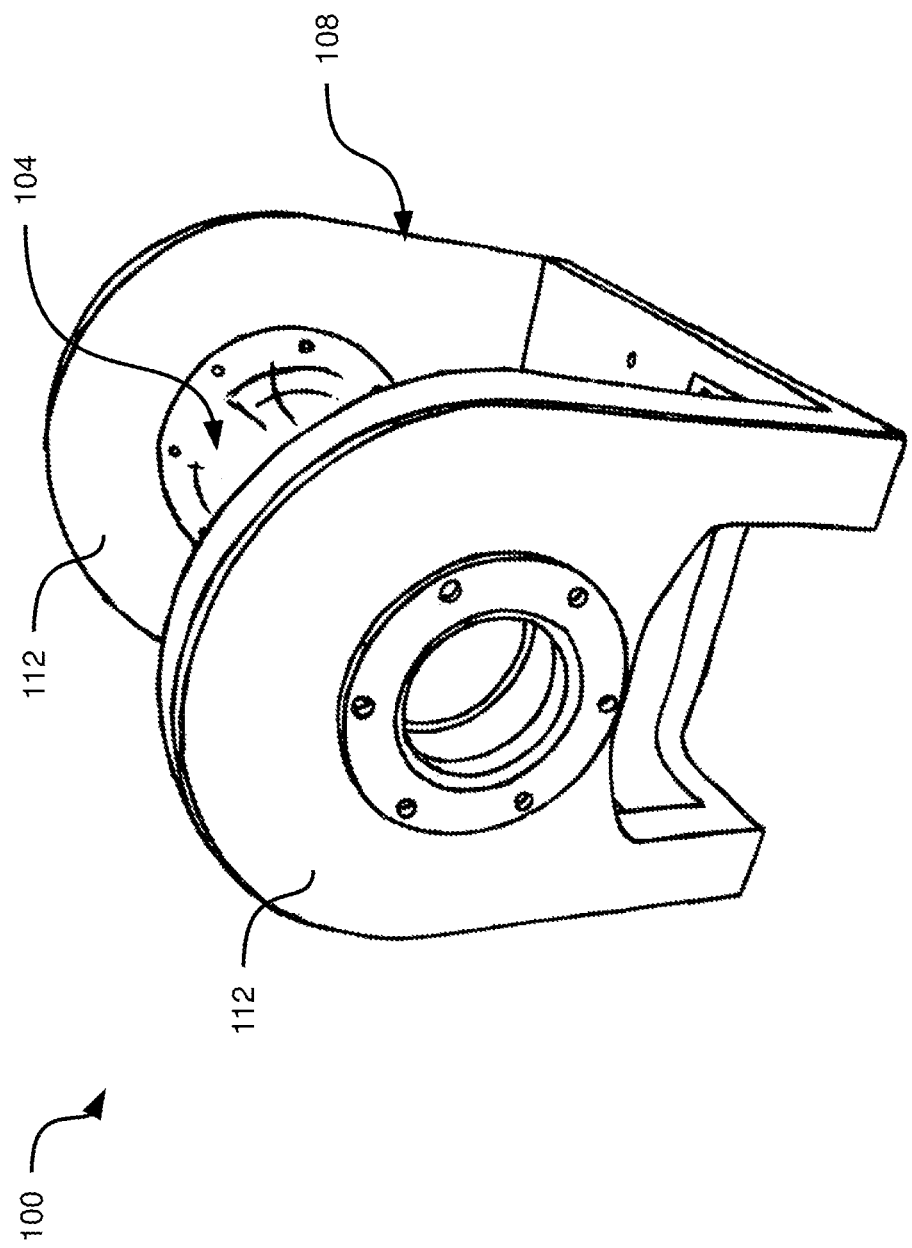
FIG. 1 depicts a spindle for a wind turbine, according to a non-limiting embodiment.

Referring to FIG. 1, a spindle 100 according to a non-limiting embodiment is shown. It is contemplated that spindle 100 can be used to support the shaft of a wind turbine, such as a roof-mounted wind turbine. It is also contemplated, however, that spindle 100 can be used in a variety of applications in which rotating shafts are employed.

Spindle 100 includes a spindle body 104, which will be described below in greater detail. Spindle 100 can also include a support structure 108. Support structure 108 can include, as shown in FIG. 1, an upstanding support plate 112 coupled to each end of spindle body 104, and a base 116 to which the support plates 112 are coupled. As shown in the present example embodiment, support plates 112 can be substantially parallel to each other, and substantially perpendicular to base 116. Further, support plates 112 and base 116 can be integrally formed of a single block of material (for example, a metal such as steel, aluminum, iron and the like).

It is also contemplated, however, that a variety of support structures 108 can be employed. In some embodiments, for example, support plates 112 and base 116 can be separate elements coupled by way of fasteners (such as bolts, screws, welds and the like). In additional embodiments, support plates need not be parallel to one another, and need not be coupled to spindle body 104 at the ends of spindle body 104. Based on the above, a variety of support structures 108 will occur to those skilled in the art.

Figure 2:
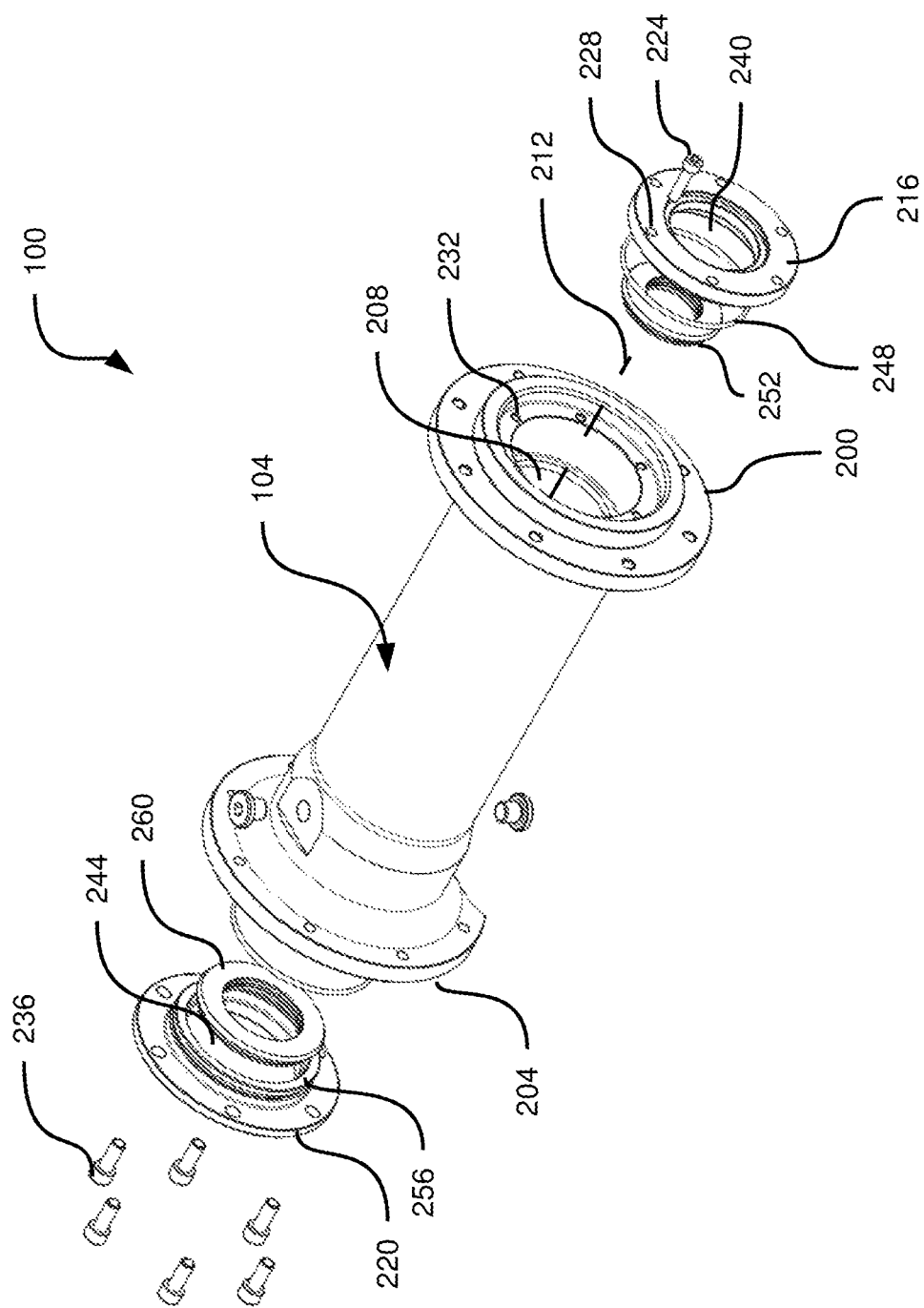
FIG. 2 depicts an exploded view of a spindle body and associated components of the spindle of FIG. 1, according to a non-limiting embodiment.

Turning now to FIG. 2, spindle body 104 and associated components are shown in greater detail. In particular, spindle body 104 includes a first end 200, a second end 204, and a channel 208 extending from first end 200 to second end 204. As shown in FIG. 2, spindle body 104 can be substantially cylindrical in shape, and channel 208 is also substantially cylindrical in shape. Thus, in the present example embodiment, spindle body 104 is generally a hollow tubular structure with a channel extending therethrough along its longitudinal axis (shown at 212). In other embodiments, the outer wall of spindle body 104 can have a non-cylindrical shape, though it will be appreciated that channel 208 should retain a substantially cylindrical shape. It will now be apparent that channel 208 is defined by an inner wall of spindle body 104. In the present example embodiment, spindle body 104 is of substantially solid construction. In other embodiments, spindle body 104 can be hollow, such that a space exists between the inner and outer walls of spindle body 104.

Spindle 100 also includes a first end cover 216 and a second end cover 220. First and second end covers 216 and 220 are releasably securable to spindle body 104 at first and second ends 200, 204 respectively. Various ways of securing first and second end covers 216 and 220 to spindle body 104 will now occur to those skilled in the art. By way of example, as shown in FIG. 2, first end cover 216 can be secured to first end 200 of spindle body 104 by way of a plurality of fasteners 224 which extend through respective through-holes 228 in first end cover 216 and into respective holes 232 at first end 200 of spindle body 104. Similarly, fasteners 236 can be used to secure second end cover 220 to spindle body 104. Fasteners 232 and 236 can be screws, such as socket head cap screws. Fasteners 232 and 236 can also include any other suitable combination of screws, bolts nails, and the like.

End covers 216 and 220 have central apertures 240 and 244, respectively, for allowing passage of a drive shaft. End covers 216 and 220, when secured to spindle body 104, define a sealed chamber or space within channel 208. To that end, additional components can be provided with end covers 216 and 220, to assist in maintaining the integrity of the seal between the sealed space within channel 208 and the exterior of spindle 100. In particular, an appropriately sized O-ring 248 and an appropriately sized bearing isolator 252 can be provided between end cover 216 and first end 200 of spindle body 104. Similarly, an O-ring 256 and a bearing isolator 260 can be provided between end cover 220 and second end 204 of spindle body 104.

Figure 3:
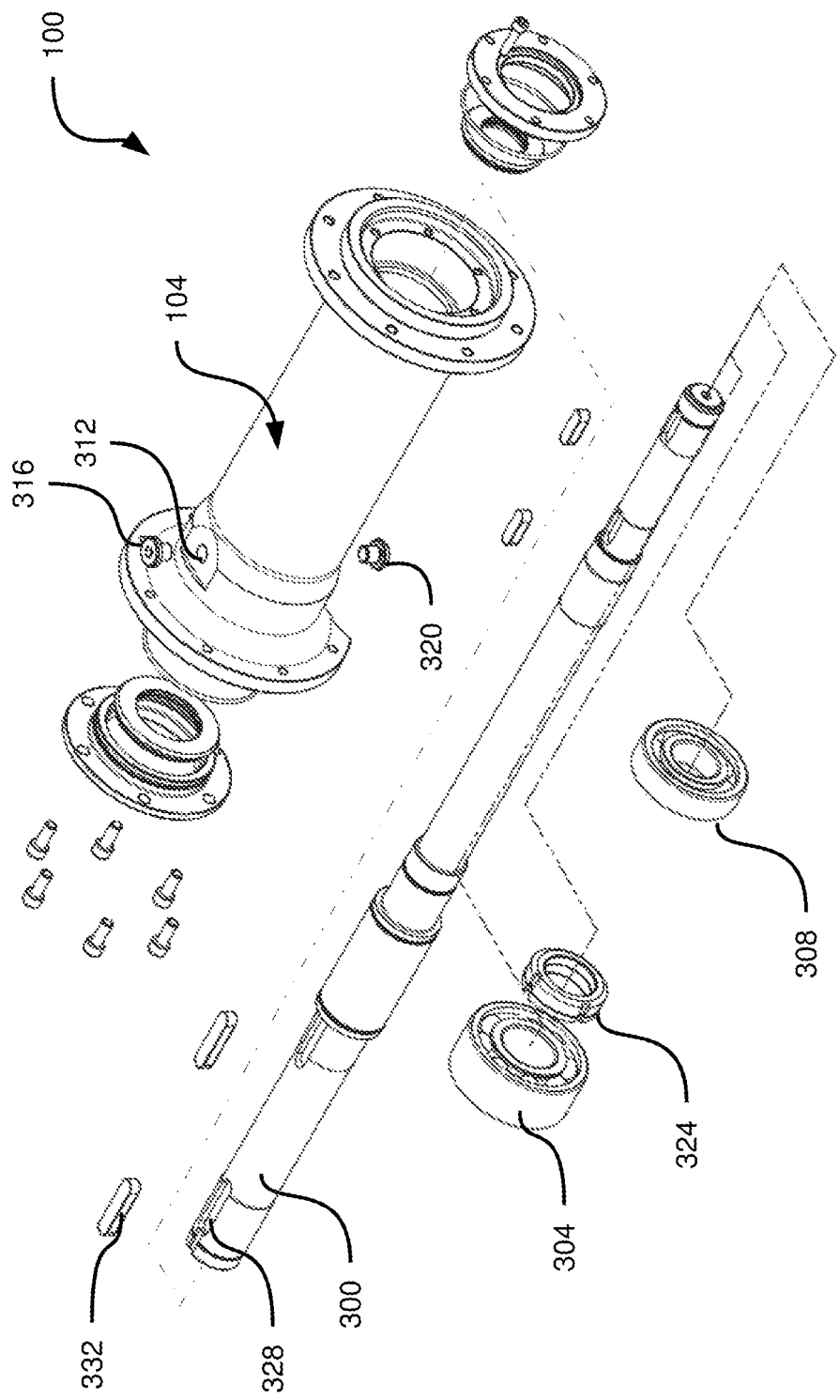
FIG. 3 depicts an exploded view of the spindle body of FIG. 2, as well as additional components housed within the spindle body, according to a non-limiting embodiment.

Channel 208 is configured to receive at least one ball bearing assembly, a drive shaft, and a fluid, such that the bearing assembly, a portion of the shaft, and the fluid are contained within the sealed space defined within channel 208 as a result of the coupling of end covers 216 and 220 to spindle body 104. Turning to FIG. 3, in addition to spindle body 104 and the associated components described above, a drive shaft 300 (also referred to herein simply as a "shaft") is shown, as are ball bearing assemblies 304 and 308. As shown in FIG. 3, shaft 300 is received through channel 208, while bearing assemblies 304 and 308 are also received within channel 208 in order to rotatably support shaft 300 within channel 208.

Figure 4:
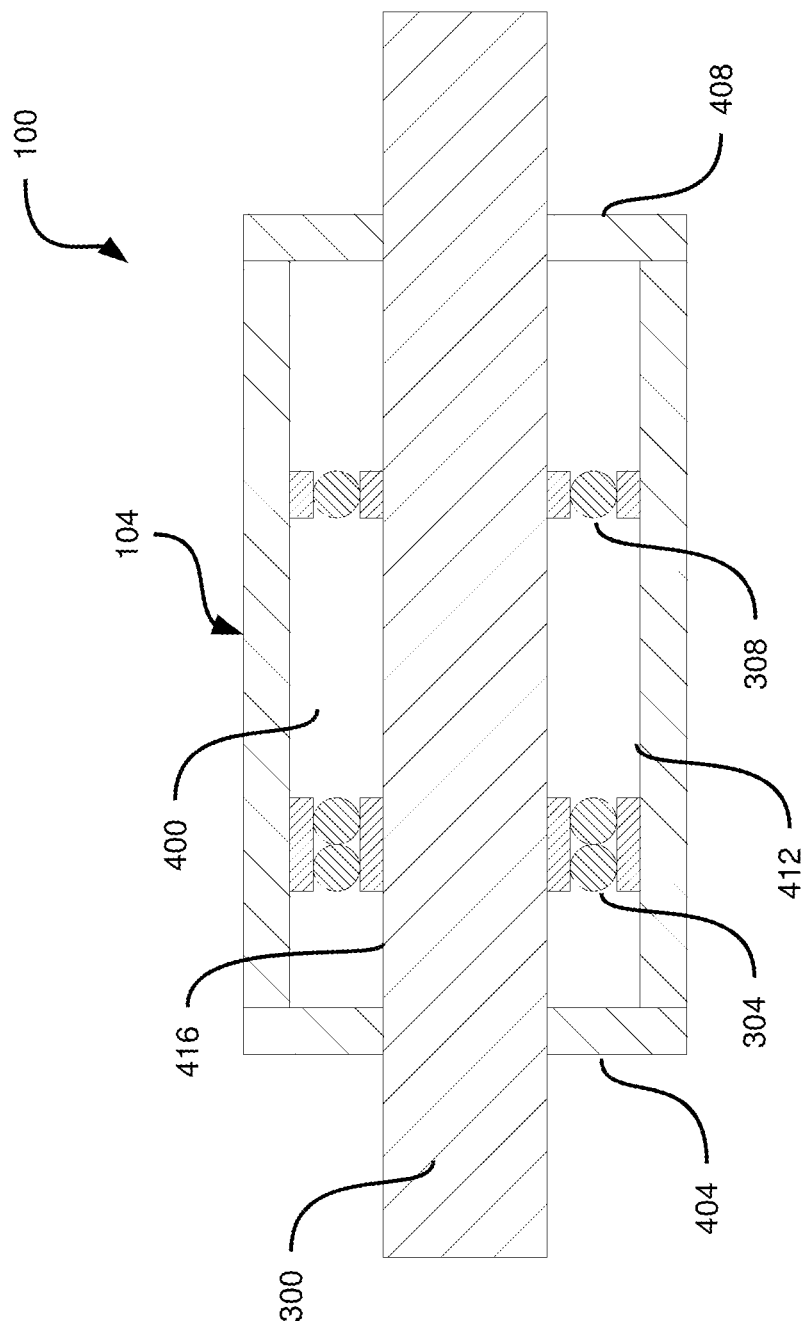
FIG. 4 depicts a schematic cross-section of the spindle body of FIG. 3, according to a non-limiting embodiment.

Turning briefly to FIG. 4, a simplified cross section of spindle 100 is shown in an assembled configuration, omitting support structure 108. In particular, a sealed chamber, or space, 400, is shown within channel 208. It will now be apparent that covers 216 and 220, as well as the associated O-rings and bearing isolators described above, have been abstracted to cover elements 404 and 408, merely for simplicity of illustration. Cover elements 404 and 408 can therefore be seen as comprising end covers 216 and 220, respectively, as well as any additional components such as O-rings 248 and 256. As seen in FIG. 4, a portion of shaft 300 is received within sealed space 400, while the ends of shaft 300 extend outside sealed space 400. The portion of shaft 300 received within sealed space 400 is rotatably supported by bearing assemblies 304 and 308, which are sized so as to contact the inner wall 412 of channel 208 and the outer surface 416 of shaft 300.

Sealed space 400 is therefore substantially sealed from exposure to the exterior of spindle body 104. Thus, as shown in FIG. 3, bearing assemblies 304 and 308 need not be pre-sealed. In the present example embodiment, bearing assembly 304 is a double row ball bearing assembly whose ball bearings are in communication with sealed space 400 when installed. Bearing assembly 308 is a single row ball bearing assembly whose ball bearings are also in communication with sealed space 400 when installed. As a result, the fluid (for example, a lubricant such as a suitable oil) received within sealed space 400 acts to lubricate each ball bearing in assemblies 304 and 308. In some embodiments, spindle body 104 can include an opening 312 which is closeable by way of a seal plug 316. Lubricant can be added and removed to sealed space 400 via opening 312. In some embodiments, as shown in FIG. 3, opening 312 can be an upper opening for receiving fluid, and spindle body 104 can include a lower opening substantially opposite to opening 312, for draining fluid from sealed space 400. Although such a lower opening is not shown in FIG. 3, a lower seal plug 320 which closes the lower opening is shown.

It is contemplated that any number of ball bearing assemblies can be received within sealed space 400. Thus, sealed space 400 provides a single chamber for housing any suitable number of unsealed ball bearing assemblies, each ball bearing of which can be lubricated by the same pool of fluid within sealed space 400.

In some embodiments, a fastener 324 can be included in conjunction with one or more of the ball bearing assemblies 304, 308, for positioning the respective ball bearing assembly respective to shaft 300. In the present embodiment, fastener 324 is a locking bearing nut operable to fix the position of ball-bearing assembly 304 at a particular point along the length of shaft 300. It is contemplated that while a similar fastener is not shown in conjunction with ball bearing assembly 308, such a fastener could be included in other embodiments.

As shown in FIG. 3, shaft 300 can include keyways such as keyway 328 and respective keys, such as key 332. Keyway 328 is configured to receive key 332, in order to enable locking shaft 300 into a rotor assembly (not shown) for generating electric power from the rotation of shaft 300. The smaller keyways shown at the opposite end of shaft 300 are configured to receive their respective keys, for locking shaft 300 to a wind turbine blade assembly (not shown).

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A spindle for a wind turbine, comprising:
   a spindle body having a first end, a second end, and a horizontal channel extending from the first end to the second end;
   a first end cover and a second end cover, the first end cover and the second end cover being releasably securable to the first end and the second end, respectively, for defining a sealed space within the channel;
   the channel being configured for receiving a plurality of ball bearing assemblies, a horizontal drive shaft locked at a first end to a rotor assembly for generating electricity, and locked at a second end, opposite the first end, to a wind turbine blade assembly, and a fluid;
   the spindle body defining an opening through a side thereof allowing communication between the channel and an exterior of the spindle body, for accepting the fluid into the channel,
   such that the plurality of bearing assemblies, a portion of the drive shaft, and the fluid are contained within the sealed space when the first and second end covers are secured to the first and second ends.

2. The spindle of claim 1, wherein the channel is substantially cylindrical and defined by an inner wall of the spindle body.

3. The spindle of claim 1, each of the first end cover and the second end cover having an aperture therethrough for accommodating the shaft.

4. The spindle of claim 1, wherein the spindle body is substantially cylindrical.

5. The spindle of claim 1, further comprising a plug for sealing the opening defined in the spindle body.

6. The spindle of claim 1, further comprising a support structure coupled to an outer surface of the spindle body, the support structure comprising a pair of upstanding support plates.

7. The spindle of claim 1, wherein the plurality of ball bearing assemblies includes a first, double row ball bearing assembly and a second, single row ball bearing assembly.

* * * * *